United States Patent
Sukhomlinov et al.

(10) Patent No.: US 10,504,221 B2
(45) Date of Patent: Dec. 10, 2019

(54) METHODS, APPARATUS AND SYSTEMS FOR MONITORING DEVICES

(71) Applicant: Intel Corporation, Santa Clara, CA (US)

(72) Inventors: Vadim Sukhomlinov, Santa Clara, CA (US); Kshitij Doshi, Tempe, AZ (US); Tamir Damian Munafo, Naale (IL)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 15/718,874

(22) Filed: Sep. 28, 2017

(65) Prior Publication Data

US 2019/0096052 A1 Mar. 28, 2019

(51) Int. Cl.
*G06T 7/00* (2017.01)
*G07C 5/12* (2006.01)
*G07C 5/08* (2006.01)
*G07C 5/00* (2006.01)

(52) U.S. Cl.
CPC ............ *G06T 7/001* (2013.01); *G07C 5/0808* (2013.01); *G07C 5/12* (2013.01); *G06T 2207/30248* (2013.01); *G07C 5/008* (2013.01)

(58) Field of Classification Search
CPC .......... G06T 7/001; G06T 2207/30248; G07C 5/008; G07C 5/12
See application file for complete search history.

(56) References Cited

U.S. PATENT DOCUMENTS

| | | | |
|---|---|---|---|
| 7,056,012 B2 | 6/2006 | Blakeley, III | |
| 7,111,981 B2 | 9/2006 | Blakeley, III | |
| 7,163,336 B2 | 1/2007 | Blakeley, III | |
| 7,168,316 B2 | 1/2007 | Blakeley, III | |
| 7,192,186 B2 | 3/2007 | Blakeley, III | |
| 7,452,127 B2 | 11/2008 | Blakeley, III | |
| 8,208,026 B2 | 6/2012 | Hogasten et al. | |
| 8,520,970 B2 | 8/2013 | Strandemar | |
| 8,565,547 B2 | 10/2013 | Strandemar | |
| 8,727,608 B2 | 5/2014 | Blakeley, III | |
| 8,749,629 B2 | 6/2014 | Baleine et al. | |
| 8,749,635 B2 | 6/2014 | Hogasten et al. | |
| 8,766,808 B2 | 7/2014 | Hogasten | |
| 8,780,208 B2 | 7/2014 | Hogasten et al. | |
| 9,058,653 B1 | 6/2015 | Kostrzewa et al. | |
| 9,083,897 B2 | 7/2015 | Hogasten et al. | |

(Continued)

FOREIGN PATENT DOCUMENTS

KR    10-1526419    11/2015

OTHER PUBLICATIONS

International Searching Authority, "Search Report," issued in connection with PCT patent application No. PCT/US2018/048366, dated Dec. 14, 2018, 8 pages.

(Continued)

*Primary Examiner* — John R Schnurr
(74) *Attorney, Agent, or Firm* — Hanley, Flight and Zimmerman, LLC

(57) ABSTRACT

Methods, apparatus, systems and articles of manufacture are disclosed herein including a monitoring system an image sensor to obtain image data of a device and a governor to cause the image sensor to obtain image data of the device, to form an impression from the image data, to use the impression and the image data to determine a verdict.

20 Claims, 11 Drawing Sheets

(56) References Cited

U.S. PATENT DOCUMENTS

| | | |
|---|---|---|
| 9,129,459 B2 | 9/2015 | Tesanovic et al. |
| 9,143,703 B2 | 9/2015 | Boulanger et al. |
| 9,171,361 B2 | 10/2015 | Strandemar |
| 9,207,708 B2 | 12/2015 | Simolon et al. |
| 9,208,542 B2 | 12/2015 | Hogasten et al. |
| 9,235,023 B2 | 1/2016 | Burt et al. |
| 9,235,876 B2 | 1/2016 | Hogasten et al. |
| 9,237,284 B2 | 1/2016 | Hogasten et al. |
| 9,247,131 B2 | 1/2016 | Kostrzewa et al. |
| 9,292,909 B2 | 3/2016 | Hogasten et al. |
| 9,451,183 B2 | 9/2016 | Hogasten et al. |
| 9,471,970 B2 | 10/2016 | Strandemar |
| 9,473,681 B2 | 10/2016 | Hoelter et al. |
| 9,509,924 B2 | 11/2016 | Terre et al. |
| 9,517,679 B2 | 12/2016 | Frank et al. |
| 9,521,289 B2 | 12/2016 | Dart et al. |
| 9,538,038 B2 | 1/2017 | Sieh et al. |
| 9,635,285 B2 | 4/2017 | Teich et al. |
| 9,674,458 B2 | 6/2017 | Teich et al. |
| 9,706,137 B2 | 7/2017 | Scanlon et al. |
| 9,706,138 B2 | 7/2017 | Teich et al. |
| 9,706,139 B2 | 7/2017 | Nussmeier et al. |
| 9,716,843 B2 | 7/2017 | Fox et al. |
| 9,716,844 B2 | 7/2017 | Nussmeier et al. |
| 9,723,227 B2 | 8/2017 | Hogasten et al. |
| 9,723,228 B2 | 8/2017 | Boulanger et al. |
| 9,756,262 B2 | 9/2017 | Frank et al. |
| 9,756,264 B2 | 9/2017 | Hoelter et al. |
| 9,807,319 B2 | 10/2017 | Teich et al. |
| 9,819,880 B2 | 11/2017 | Hogasten et al. |
| 9,843,742 B2 | 12/2017 | Garrow et al. |
| 9,843,743 B2 | 12/2017 | Lewis et al. |
| 9,848,134 B2 | 12/2017 | Simolon et al. |
| 9,900,478 B2 | 2/2018 | Fox et al. |
| 9,900,526 B2 | 2/2018 | Kostrzewa et al. |
| 9,918,023 B2 | 3/2018 | Simolon et al. |
| 9,948,872 B2 | 4/2018 | Frank et al. |
| 9,948,878 B2 | 4/2018 | Simolon et al. |
| 9,961,277 B2 | 5/2018 | Hoelter et al. |
| 9,973,692 B2 | 5/2018 | Szabo et al. |
| 9,986,175 B2 | 5/2018 | Frank et al. |
| 10,044,946 B2 | 8/2018 | Strandemar et al. |
| 10,051,210 B2 | 8/2018 | Nussmeier et al. |
| 10,079,982 B2 | 9/2018 | Boulanger et al. |
| 10,091,439 B2 | 10/2018 | Hogasten et al. |
| 2004/0066833 A1 | 4/2004 | Blakeley, III |
| 2005/0031013 A1 | 2/2005 | Blakeley, III |
| 2005/0147152 A1 | 7/2005 | Blakeley, III |
| 2005/0178199 A1 | 8/2005 | Blakeley, III |
| 2006/0227846 A1 | 10/2006 | Blakeley, III |
| 2007/0019705 A1 | 1/2007 | Blakeley, III |
| 2008/0259993 A1 | 10/2008 | Blakeley |
| 2010/0220193 A1 | 9/2010 | Hogasten et al. |
| 2010/0309315 A1 | 12/2010 | Hogasten et al. |
| 2011/0221599 A1 | 9/2011 | Hogasten |
| 2011/0261207 A1 | 10/2011 | Strandemar |
| 2011/0262053 A1 | 10/2011 | Strandemar |
| 2012/0200698 A1 | 8/2012 | Baleine et al. |
| 2012/0262584 A1 | 10/2012 | Strandemar |
| 2012/0312976 A1 | 12/2012 | Boulanger et al. |
| 2012/0321212 A1 | 12/2012 | Hogasten et al. |
| 2013/0022279 A1 | 1/2013 | Hogasten et al. |
| 2013/0173435 A1 | 7/2013 | Cozad, Jr. |
| 2013/0242110 A1 | 9/2013 | Terre et al. |
| 2013/0250102 A1 | 9/2013 | Scanlon et al. |
| 2013/0250125 A1 | 9/2013 | Garrow et al. |
| 2013/0253551 A1 | 9/2013 | Boyle et al. |
| 2013/0258111 A1 | 10/2013 | Frank et al. |
| 2013/0270441 A1 | 10/2013 | Burt et al. |
| 2013/0278771 A1 | 10/2013 | Magoun et al. |
| 2013/0300875 A1 | 11/2013 | Strandemar et al. |
| 2013/0314536 A1 | 11/2013 | Frank et al. |
| 2013/0321637 A1 | 12/2013 | Frank et al. |
| 2013/0329054 A1 | 12/2013 | Hoelter et al. |
| 2013/0342691 A1 | 12/2013 | Lewis et al. |
| 2014/0015982 A9 | 1/2014 | Strandemar |
| 2014/0016879 A1 | 1/2014 | Hogasten et al. |
| 2014/0037225 A1 | 2/2014 | Hogasten et al. |
| 2014/0085482 A1 | 3/2014 | Teich et al. |
| 2014/0092256 A1 | 4/2014 | Simolon et al. |
| 2014/0092257 A1 | 4/2014 | Hogasten et al. |
| 2014/0092258 A1 | 4/2014 | Dart et al. |
| 2014/0093133 A1 | 4/2014 | Frank et al. |
| 2014/0098237 A1 | 4/2014 | Sieh et al. |
| 2014/0098238 A1 | 4/2014 | Boulanger et al. |
| 2014/0104415 A1 | 4/2014 | Fox et al. |
| 2014/0108850 A1 | 4/2014 | Simolon et al. |
| 2014/0112537 A1 | 4/2014 | Frank et al. |
| 2014/0139643 A1 | 5/2014 | Hogasten et al. |
| 2014/0139685 A1 | 5/2014 | Nussmeier et al. |
| 2014/0168433 A1* | 6/2014 | Frank ................ H04N 5/33 348/143 |
| 2014/0168445 A1 | 6/2014 | Hogasten et al. |
| 2014/0184807 A1 | 7/2014 | Simolon et al. |
| 2014/0218520 A1 | 8/2014 | Teich et al. |
| 2014/0232875 A1 | 8/2014 | Boulanger et al. |
| 2014/0240512 A1 | 8/2014 | Hogasten et al. |
| 2014/0253735 A1 | 9/2014 | Fox et al. |
| 2014/0285672 A1 | 9/2014 | Hogasten et al. |
| 2015/0006018 A1 | 1/2015 | Tesanovic et al. |
| 2015/0085133 A1 | 3/2015 | Teich et al. |
| 2015/0109454 A1 | 4/2015 | Strandemar et al. |
| 2015/0146009 A1 | 5/2015 | Kostrzewa et al. |
| 2015/0172545 A1 | 6/2015 | Szabo et al. |
| 2015/0288892 A1 | 10/2015 | Frank et al. |
| 2015/0296146 A1 | 10/2015 | Scanlon et al. |
| 2015/0312488 A1 | 10/2015 | Kostrzewa et al. |
| 2015/0312489 A1 | 10/2015 | Hoelter et al. |
| 2015/0319378 A1 | 11/2015 | Hoelter et al. |
| 2015/0319379 A1 | 11/2015 | Nussmeier et al. |
| 2015/0332441 A1 | 11/2015 | Hogasten et al. |
| 2015/0334315 A1 | 11/2015 | Teich et al. |
| 2015/0358560 A1 | 12/2015 | Boulanger et al. |
| 2015/0365592 A1 | 12/2015 | Kostrzewa et al. |
| 2015/0379361 A1 | 12/2015 | Boulanger |
| 2016/0042503 A1 | 2/2016 | Strandemar |
| 2016/0074724 A1 | 3/2016 | Terre |
| 2016/0156880 A1 | 6/2016 | Teich et al. |
| 2016/0224055 A1 | 8/2016 | Simolon et al. |
| 2016/0316119 A1 | 10/2016 | Kent |
| 2016/0316154 A1 | 10/2016 | Elmfors et al. |
| 2016/0366345 A1 | 12/2016 | Nussmeier et al. |
| 2017/0004609 A1 | 1/2017 | Strandemar |
| 2017/0078590 A1 | 3/2017 | Hogasten et al. |
| 2017/0088098 A1 | 3/2017 | Frank et al. |
| 2017/0208260 A1 | 7/2017 | Terre et al. |
| 2017/0318237 A1 | 11/2017 | Nussmeier et al. |
| 2017/0359526 A1 | 12/2017 | Boulanger et al. |
| 2017/0374261 A1 | 12/2017 | Teich et al. |
| 2017/0374298 A1 | 12/2017 | Teich et al. |
| 2019/0032508 A1* | 1/2019 | Wang ................ F01D 21/003 |

OTHER PUBLICATIONS

International Searching Authority, "Written Opinion," issued in connection with PCT patent application No. PCT/US2018/048366, dated Dec. 14, 2018, 12 pages.

ECN Magazine, "Active pixel infrared thermometer array overcomes cost hurdles associated with thermal imaging," published Mar. 20, 2012, retrieved from Internet on Sep. 28, 2017, [https://www.ecnmag.com/product-release/2012/03/active-pixel-infrared-thermometer-array-overcomes-cost-hurdles-associated-thermal-imaging], 3 pages.

* cited by examiner

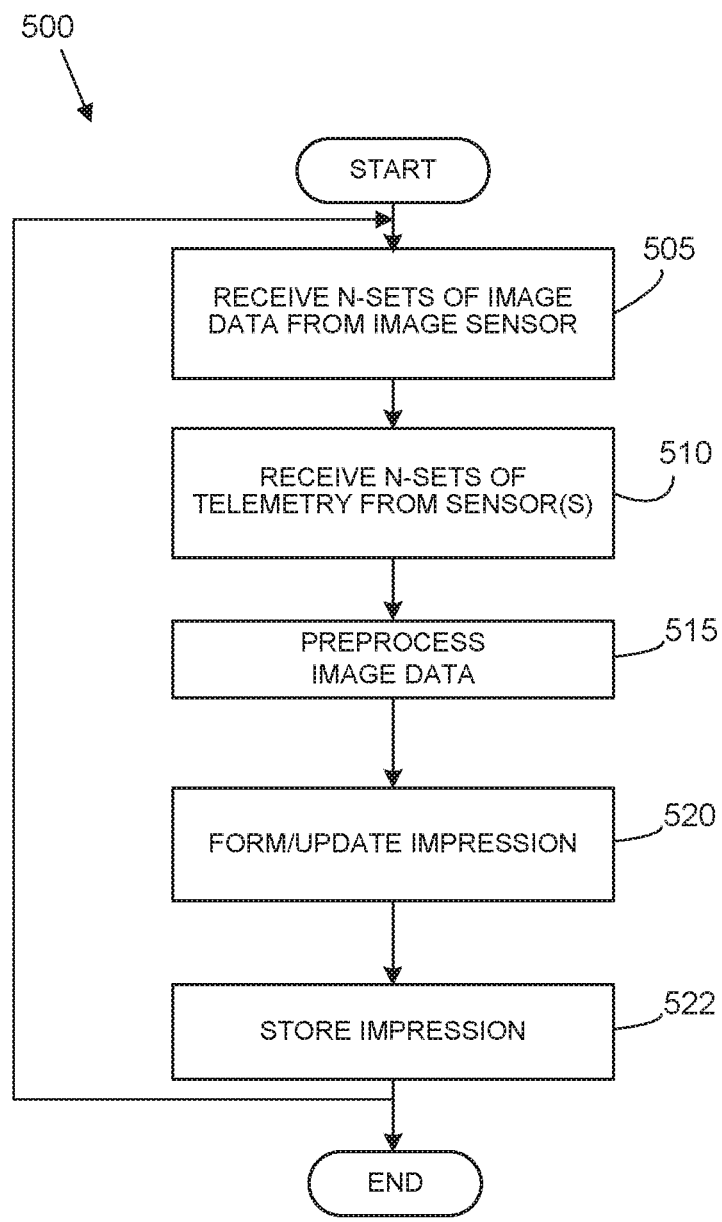

METHODS, APPARATUS AND SYSTEMS FOR MONITORING DEVICES

FIELD OF THE DISCLOSURE

This disclosure relates generally to monitoring, and, more particularly, to methods, apparatus and systems for monitoring devices.

BACKGROUND

Conventional monitoring systems typically rely on alerts from sensors and analysis of event streams to infer that an anomalous condition has manifested. However, mechanical malfunctions may present an indirect and diffused correlation on behavioral parameters over a long period of time. Consequently, mechanical malfunctions may escape detection until such time as a serious degradation exists.

BRIEF DESCRIPTION OF THE DRAWINGS

FIGS. 5A-5B present flowchart representations of computer-executable instructions that may be executed to implement the example governor of FIGS. 1-2.

The figures are not to scale. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Conventional monitoring systems may fail to detect degradation of a mechanical system. In manned systems, such as a vehicle with a driver, vehicle sensory data is supplemented by humans who may notice subtle alterations in vehicle performance, unusual noises, unusual smells, or the like, and who may assess the need to investigate further. Such conventional monitoring systems use data streams from system sensors (e.g., engine rotation speed, vibration, tire pressure, etc.) as indicators, but these data streams at times prove insufficient to discover a problem or indicate a severity of a problem. Autonomous systems likewise receive data streams from internal sensors and analyze the data streams to draw inferences therefrom. This monitoring paradigm and analysis is suitable for simple mechanisms of degradation. For instance, a low tire pressure indicator is sufficient to alert as to a low tire pressure. However, a variety of mechanical failure mechanisms can prove difficult to diagnose via on-board sensors. For instance, a blown head gasket could manifest in a variety of ways (e.g., misfires, lowered compression, overheating, swelling of the radiator cap, corruption of fluids, oil leak, coolant leak, whitish exhaust, etc.).

In accord with the some teachings of this disclosure, autonomous devices (e.g., autonomous land vehicles, autonomous aerial vehicles, drones, robots, spacecraft, industrial equipment or machinery, etc.) and/or manned devices (e.g., terrestrial vehicles, aircraft, watercraft, etc.) implement an example governor to monitor one or more systems, subsystems, or components to assess damage and/or degradation of the apparatus/device, including any system(s), subsystem(s), or component(s). The example governor helps to eliminate the human in-the-loop performing manual screening of autonomous devices and helps to increase device autonomy.

Figure 1:
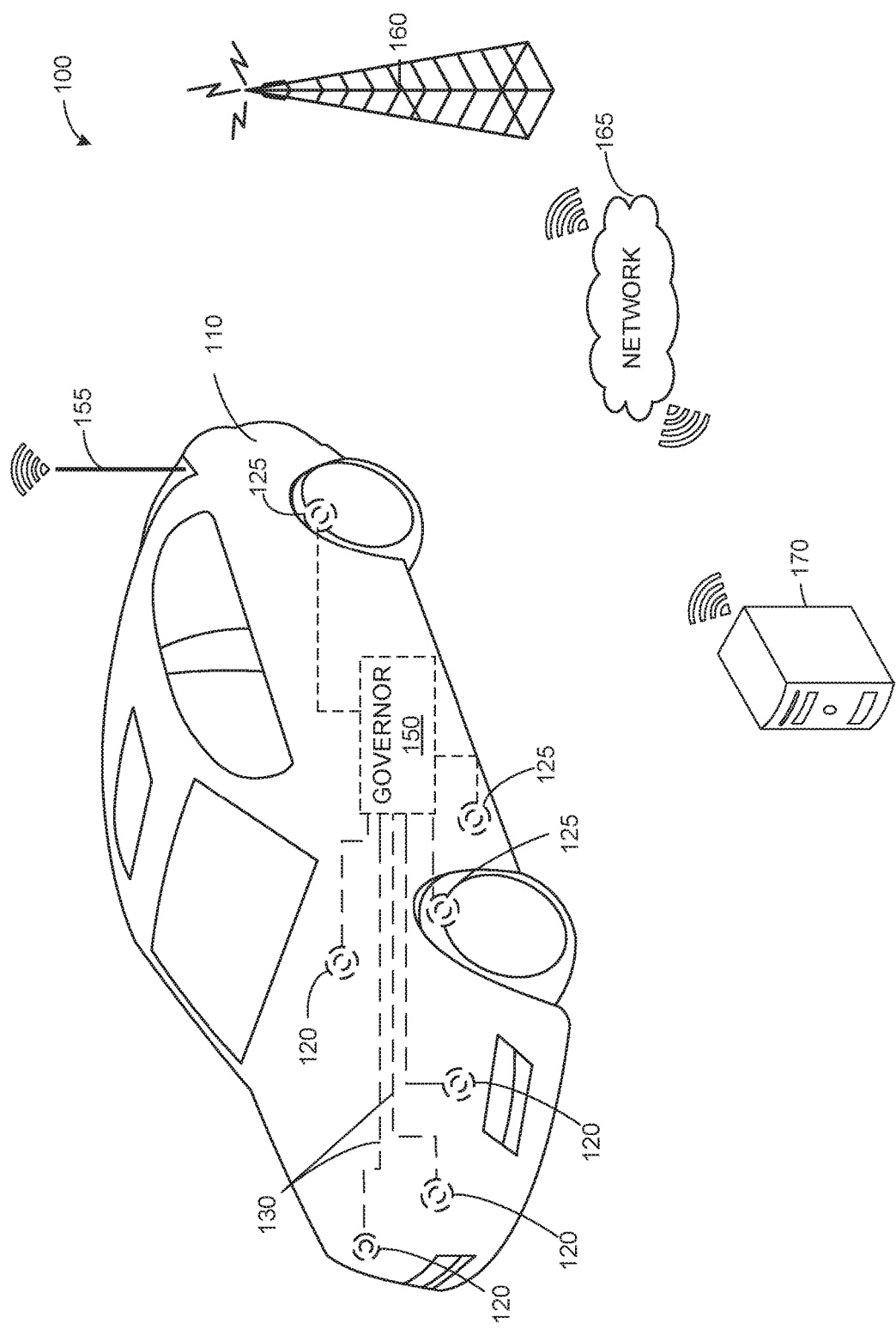
FIG. 1 is a schematic illustration of an example device for monitoring systems and structures implemented in an example vehicle constructed in accordance with some teachings of this disclosure.

FIG. 1 is a schematic illustration of an example system 100 for monitoring systems and structures implemented in an example device 110, which may be autonomous or manned. While the example of FIG. 1 depicts a device 110, the teachings herein likewise apply to other types of autonomous devices and/or manned devices, such as those noted above.

As shown in FIG. 1, the device 110 includes one or more example image sensors 120 (hereinafter "image sensor 120" for brevity) in one or more areas of the vehicle (e.g., one or more areas of an engine compartment, motor(s), undercarriage, brake system, etc.). In some examples, the image sensor 120 includes a thermal image sensor, a spatial image sensor and/or an optical image sensor. FIG. 1 also shows the device 110 to include one or more example sensors 125 (e.g., one or more pressure sensor(s), one or more vibration sensor(s), one or more velocity sensor(s) and/or one or more acceleration sensor(s), etc.) in one or more areas of the vehicle to provide telemetry data for one or more systems or subsystems of the device 110.

The image sensor 120 is to obtain example image data, such as thermal image data, spatial image data and/or optical image data, of the area(s) of the device 110 in which the image sensor 120 is disposed. In some examples, the image sensor 120 may include the non-contact MLX90620 temperature measurement device from Melexis of Belgium, which includes a 16×4 element far infrared (FIR) thermopile sensor array constructed to produce a real-time map of heat values. In some examples, the image sensor 120 includes a spatial image sensor like Intel® RealSense™ Depth Module D400.

The image sensor 120 outputs the image data via an example communication pathway 130, such as a hardwired communication pathway or a wireless communication pathway, to an example governor 150. In some examples, the governor 150 is disposed within the device 110. For instance, the governor 150 may be disposed in a dashboard, under a seat, or in a trunk of the device 110. In some examples, the governor 150 is disposed at a remote location (e.g., external to the device 110, in a different region than the device 110, etc.). As described below, the governor 150 processes the image data from the image sensor 120 and outputs the image data and/or a derivative thereof, via a communication device 155, to an example RF broadcast tower 160 and/or an example network 165.

In some examples, the communication device 155 includes a device such as a transmitter, a transceiver, a modem and/or network interface card to facilitate exchange of the image data with one or more external machines 170 (e.g., computing devices of any kind, computer, server, etc.) via the RF broadcast tower 160 and/or network 165. In some examples, the communication device 155 may communicate, directly or indirectly (e.g., via one or more intermediary devices), to the network 165 via an Ethernet connection, a digital subscriber line (DSL), a telephone line, coaxial cable, a cellular telephone system, a 10Base-T connection, a FireWire connector or a Universal Serial Bus (USB) connector. Thus, while an example RF broadcast tower 160 and an example communication device 155 are indicated in the example of FIG. 1, in some examples the example governor 150 is connected to one or more external machines 170 via a hardwired connection (e.g., a USB connection).

Figure 2:
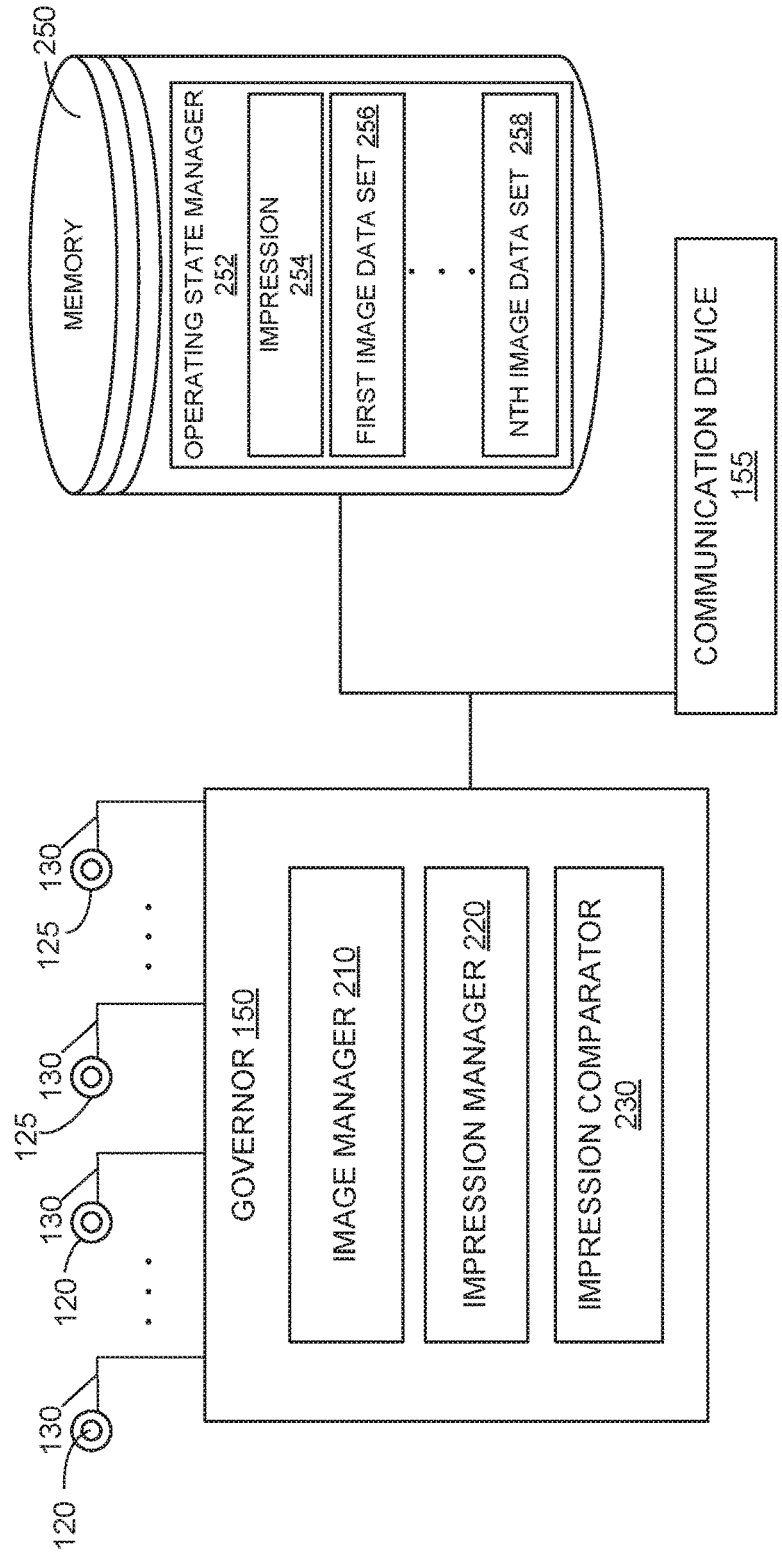
FIG. 2 is a block diagram of an example implementation of the governor 150 of FIG. 1.

FIG. 2 is a block diagram of an example implementation of the governor 150 of FIG. 1. In the example implementation of FIG. 2, the governor 150 includes an example image manager 210, an example impression manager 220 and an example impression comparator 230.

In general, the example governor 150 is to cause the image sensor 120 to obtain example image data of the structure of the device 110 at a first time, from which an example impression may be formed. The impression facilitates comparison of actual data from sensor data with data calculated as a result of applying a trained model or impression for previous data. For instance, in a first example, where previous samples of data at times t−1, t−2, . . . t−N are known and the example governor 150 receives sensor data at time t, the governor 150 applies the impression to the data samples at moments times t−1, t−2, . . . t−N and calculates estimated data for time t using the impression. The governor 150 then compares the estimated data at time t with the actual data at time t and determines a verdict as to whether the comparison is favorable (e.g., a "good" state) or unfavorable (e.g., a "bad" state). In a second example, where previous samples of data at times t−1, t−2, . . . t−N are known and the example governor 150 receives sensor data at time t, the governor 150 applies the impression to the data samples at moments times t, t−1, t−2, . . . t−N and determines a verdict as to whether the comparison is favorable (e.g., a "good" state), unfavorable (e.g., a "bad" state) or "unknown." The impression can be updated continuously after every sample of data, periodically, or aperiodically. For instance, in some examples, the governor 150 updates the impression periodically using batches of data. In some examples, the governor 150 updates the impression when a new classification becomes available in response to telemetry data or an external expert system. The impression allows the governor 150 to determine if measured data is close to data that is predicted, with the governor 150 calculating a verdict (e.g., "good" state or "bad" state) through a comparison of predicted data and measured data (e.g., a neural net "feedforward" evaluation) and modifying or updating the impression to integrate input data of which the governor 150 was not previously familiar (e.g., a neural net "backpropagation" or training).

The example image manager 210 is to receive and process example image data from the image sensor 120 and to pass the image data to the example impression manager 220 for processing. In some examples, the example image manager 210 obtains image data of the structure of the device 110 responsive to a request from the governor 150.

The example impression manager 220 is to use the image data to form an impression or trained model of the structure of the device 110 imaged by the image sensor 120. In some examples, each volume and/or surface area in a field of view, or points of view, of the image sensor 120 is assigned a value corresponding to the image data obtained by the image sensor 120. In some examples, the impression can be a set of weights in a matrix representing a neural network (e.g., Artificial Neural Network (ANN), Recurrent Neural Network (RNN), Convolutional Neural Network (CNN), Deep Neural Network (DNN), etc.) or some other representation of behavior (e.g., a "decision tree," Support Vector Machine (SVM), Logistic Regression (LR), etc.). The impression is trained (e.g., matrix coefficients are updated, etc.) using data from the image sensor 120. For example, a thermal image sensor would output image data including a temperature reading at each point or pixel in a field of view (e.g., a 640×480 thermal image sensor may include 307,200 pixels) and a spatial image sensor would output distances (e.g., via time-of-flight) at each point or pixel in a field of view (e.g., a point cloud of a 3D image sensor, etc.). The point cloud data for temperature and/or distance is brought into a common reference system (e.g., polar, Cartesian, etc.). The result of training is a modified impression which accommodates or integrates valid changes in image data.

In some examples, an impression may include an arrangement of raw data, such as a temperature in a volume or surface area defined by a selected coordinate system, or a derivative of the raw data, such as a map of spatial thermal gradients within a given volume and/or a mapping of the spatial thermal gradients onto a coefficients vector (e.g., a Radon transform). The example impression manager 220 may use any manner of expression of the image data to uniquely identify the imaged operational state. For instance, the impression manager 220 may convert the image data into an alternative representation via a mathematical transform, linear transform, matrix representation, linear mapping, eigenvalue decomposition, wavelet decomposition, geometric multiscale analysis, polygonal 3D model, surface model, non-uniform rational basis spline (NURBS) surface model, polygon mesh, and store and/or export the representation in a suitable format (e.g., as a Standard Tessellation Language (STL) file, Standard ACIS Text (SAT) file and/or OBJ geometry file, or any other 3D modelling file format).

In some examples an initial impression is provided by a manufacturer of the device 110 (e.g., a vehicle, etc.) and the initial impression is updated using image data from the image sensor 120.

In some examples, the example impression comparator 230 is to apply an impression to samples of image data at times t−1, t−2, . . . t−N and to calculate estimated image data for time t. The impression comparator 230 then compares the estimated image data for time t to actual image data from the imager 120 for time t to determine a level of correspondence between the estimated image data for time t to the actual image data at time t. The impression comparator 230 then renders a verdict as to whether or not the actual data corresponds to a "known good" state or a "known bad" state. In some examples, the example impression comparator 230 is to apply an impression to samples of image data at times t, t−1, t−2, . . . t−N and is to calculate a verdict estimated image data for time t (e.g., a "known good" state, a "known bad" state, an "unknown" state, etc.).

In some instance, the impression manager 220 maps spatial gradients and/or thermal gradients onto a coefficients vector (e.g., by a Radon transform, Hough transform, Funk transform, combinations of transforms, etc.) to form and/or update the impression and the impression comparator 230 is to compare basis vectors in a vector space as between sets of image data at different times to determine to detect correspondence between the image data and a known state (e.g., good state, a bad state, etc.) and/or an unknown state.

In some examples, the governor 150 outputs an example impression and/or the image data relating to the impression, or derivatives thereof, to an example memory 250. The example memory 250 includes, in an example operating state manager 252 corresponding to an operating state of the device, the example impression 254, including image data relating to the impression 254 and/or derivatives thereof. In some examples, the operating state manager 252 differentiates between a plurality of operating states (e.g., one or more "known good" state(s), one or more "known bad" state(s), etc.). The operating state manager 252 also includes an example first image data set 256 and successive image data sets to the first image data set 256 through an example $N^{th}$ image data set 258, where N is any integer. In some examples, the first image data set 256 and/or another other image data set through the $N^{th}$ image data set 258 include more than one image data set (e.g., a plurality of image data sets from a plurality of different times). In some examples, the first image data set 256 is preloaded into the memory 250 by a vendor of the device 110.

In some examples, the memory 250 is local to the device 110. In some examples, the memory 250 is remote to the device 110 and communication between the governor 150 and the memory 250 is via the communication device 155 and/or via the communication device 155 and any intermediary devices such as the RF broadcast tower 160 and/or the network 165.

While an example manner of implementing the governor 150 of FIG. 1 is illustrated in FIG. 2, one or more of the elements, processes and/or devices illustrated in FIG. 2 may be combined, divided, re-arranged, omitted, eliminated and/or implemented in any other way. Further, the example image manager 210, the example impression manager 220 and/or the example impression comparator 230 and/or, more generally, the example governor 150 of FIG. 2 may be implemented by hardware, software, firmware and/or any combination of hardware, software and/or firmware. Thus, for example, any of the example image manager 210, the example impression manager 220 and/or the example impression comparator 230 and/or, more generally, the example governor 150 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image manager 210, the example impression manager 220 and/or the example impression comparator 230 and/or, more generally, the example governor 150 is/are hereby expressly defined to include a non-transitory computer readable storage device or storage disk such as a memory, a digital versatile disk (DVD), a compact disk (CD), a Blu-ray disk, etc. including the software and/or firmware. Further still, the example governor 150 of FIG. 1 may include one or more elements, processes and/or devices in addition to, or instead of, those illustrated in FIG. 2, and/or may include more than one of any or all of the illustrated elements, processes and devices.

Figure 5B:
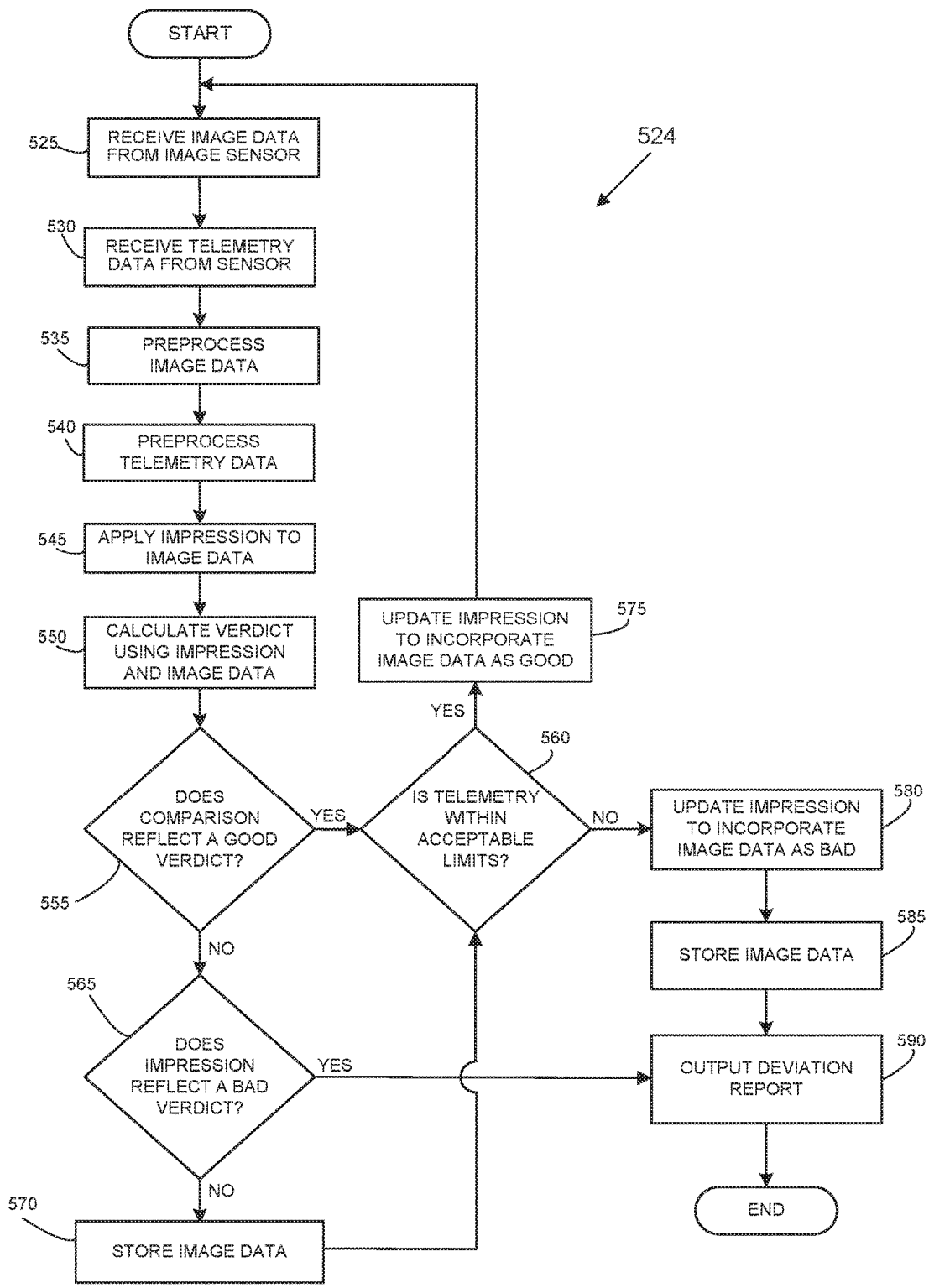

A flowchart representative of example machine readable instructions for implementing the governor 150 of FIG. 2 is shown in FIGS. 5A-5B. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 5A-5B, many other methods of implementing the example governor 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5A-5B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 3A:
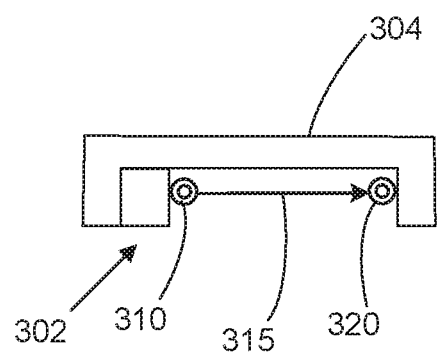
FIGS. 3A-3C illustrate example implementations of example image sensors to provide example image data to the example governor of FIG. 1 in accordance with some teachings of this disclosure.

FIG. 3A shows an example image sensor 302 disposed in an example engine compartment structure 304. The example image sensor 302 includes an example laser 310, powered by a power source (not shown), disposed to emit an example beam of collimated light 315 at an example photosensor 320. In some examples, the photosensor 320 includes a photodiode. The laser 310 may include any laser of any wavelength (e.g., any wavelength between 650-1550 nm) and may include, for example, a diode laser or a semiconductor laser. In some examples, the image sensor 302 includes an Adafruit VL53L0X Time of Flight Distance Sensor. In some examples, the power source for the laser 310 includes a battery of the device (e.g., autonomous and/or manned device, device 110, etc.) implementing the image sensor 302. The image sensor 302 and the photosensor 320 form part of an optical circuit in which photons of the incident beam of collimated light 315 are converted into current representative of an alignment between the laser 310 and the photosensor 320. A change in an intensity of the incident beam of collimated light 315 on the photosensor 320 may indicate a shift of one part of the example engine compartment structure 304 relative to another part of the engine compartment structure 304.

In some examples, the image sensor 302 includes a plurality of image sensors 302 producing vectors of measured values, with each of the image sensors 302 producing scalar values combinable with respect to time as a tuple on n-vector, where n is any integer.

Figure 3B:
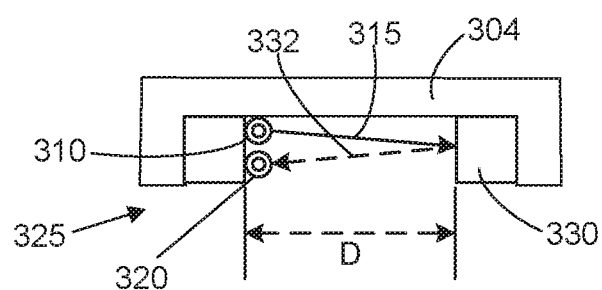

FIG. 3B shows an example image sensor 325 disposed in an example engine compartment structure 304. In some examples, the example image sensor 325 is a time-of-flight image sensor such as, but not limited to, a range gated image sensor, a direct time-of-flight image sensor, or a sonic range finder. The example image sensor 325 includes an example laser 310, powered by a power source (not shown), disposed to emit an example beam of collimated light 315 at an object 330. The example image sensor 325 also includes a photosensor 320 to receive reflected light from the object 330 responsive to the incident beam of collimated light 315. In some examples, the photosensor 320 includes a collection lens disposed adjacent the laser 310 to focuses the incident light thereto onto a solid-state photodiode (e.g., a linear array camera, a CMOS array, etc.). The laser 310 may include any laser of any wavelength (e.g., any wavelength between 650-1550 nm) and may include, for example, a diode laser or a semiconductor laser. In some examples, the power source for the laser 310 includes a battery of the device (e.g., autonomous and/or manned device, device 110, etc.) implementing the image sensor 302. The image sensor 302 and the photosensor 320 form part of an optical circuit in which photons of the incident light 332 are converted into current representative of a distance between the image sensor 325 and the object 330, which is in turn representative of an alignment between the image sensor 325 and the object 330. A change in an intensity of the incident light 332 on the photosensor 320 and/or phase shift of the incident light 332 may indicate a shift of one part of the example engine compartment structure 304 relative to another part of the engine compartment structure 304. A combination of distance data between multiple points enables development of a computational geometry of constituent parts.

Figure 3C:
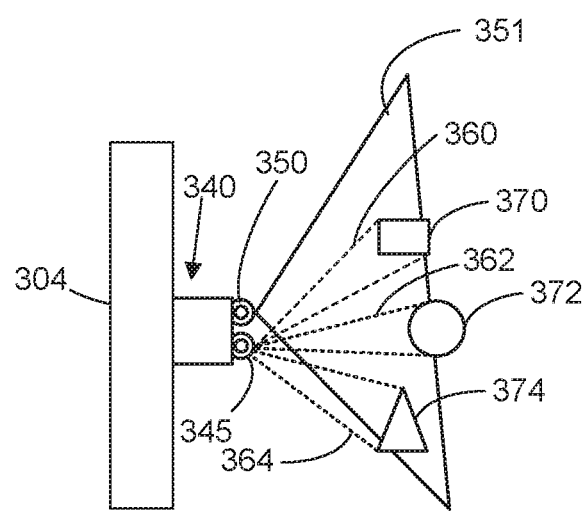

FIG. 3C shows an example image sensor 340 disposed in an example engine compartment structure 304. In some examples, the example image sensor 340 is a Light Detection and Ranging (LIDAR) device or a 3D-camera including an example laser scanner 345 and/or light source. In some examples, the laser scanner 345 is to emit a scanning beam 351 of collimated light across a selected volume of the structure of the device (e.g., a volume within an engine compartment of a device 110, etc.) to produce a point cloud of distance information or a depth map using phase shifts in return signals to the laser scanner 345. For instance, FIG. 3C illustrates, responsive to illumination by the image sensor 340, an example first cone 360 of reflected light, an example second cone 362 of reflected light and an example third cone 364 of reflected light incident, respectively, from an example first object 370, an example second object 372 and an example third object 374 of the structure of the autonomous and/or manned device.

The reflected light from the example first object 370, the example second object 372 and the example third object 374 interacts with one or more lenses and photosensors of the image sensor 340 yielding, via time-of-flight, distance data for each point in the point cloud. The image sensor 340 is to build a map (e.g., a distance map and/or a thermal map) of a selected volume of the structure of the autonomous and/or manned device (e.g., a volume within the engine compartment, etc.) from which the governor 150 can detect deviations in alignment and/or temperature. In some examples, the light source 350 includes one or more lights to illuminate a selected volume of the structure of the autonomous and/or manned device (e.g., a volume within the engine compartment, etc.). In some examples, the light source 350 includes a solid-state diode, a lamp, and/or a bulb to output light in one or more ranges of wavelengths (e.g., visible light spectrum, infrared light spectrum, etc.). In some examples, the image sensor 340 includes RealSense™ technology from Intel®, such as an Intel® RealSense™ Depth Module D400 Series image sensor.

In some examples, the impression manager 220 integrates or associates the image data from the image sensor 120 (e.g., image sensor 302, 325, 340) with telemetry data from one or more additional sensors 125 of the autonomous and/or manned device. For instance, image data used by the impression manager 220 to form and/or update the impression 254 may be associated with data from one or more other sensors 125 (e.g., a pressure sensor, a vibration sensor, a velocity sensor, an acceleration sensor, etc.) operatively associated with one or more systems or subsystems of the device (e.g., autonomous and/or manned device, device 110). The impression comparator 230 is thus informed as to changes in an operating condition and is able to contextually determine whether a rendered verdict is indicative of a changed operating condition or is indicative of a potential malfunction.

Figure 4A:
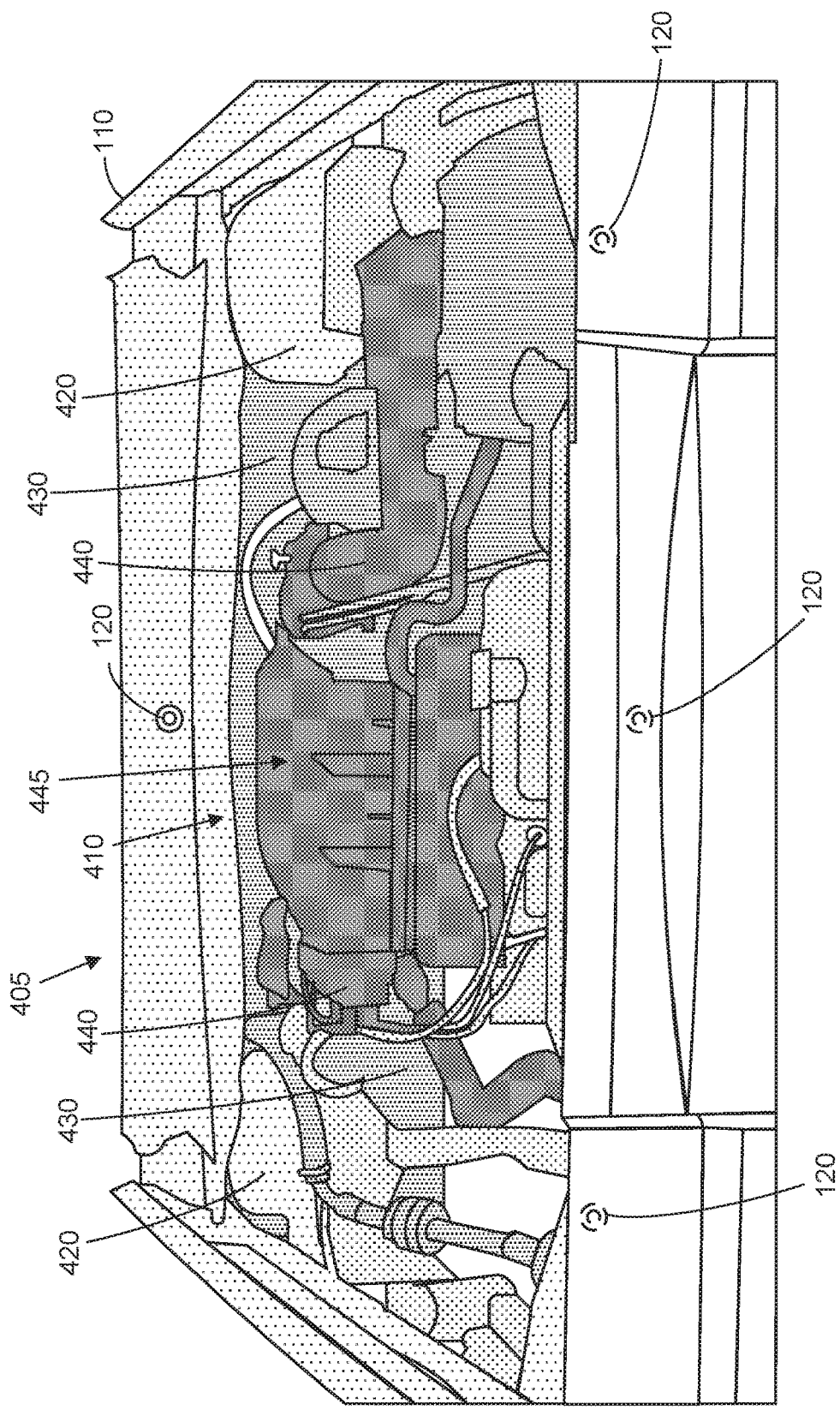
FIGS. 4A-4B illustrate example image data from the example image sensors of FIGS. 3A-3C at a first time and at a second time, respectively, in accordance with some teachings of this disclosure.
Figure 4B:
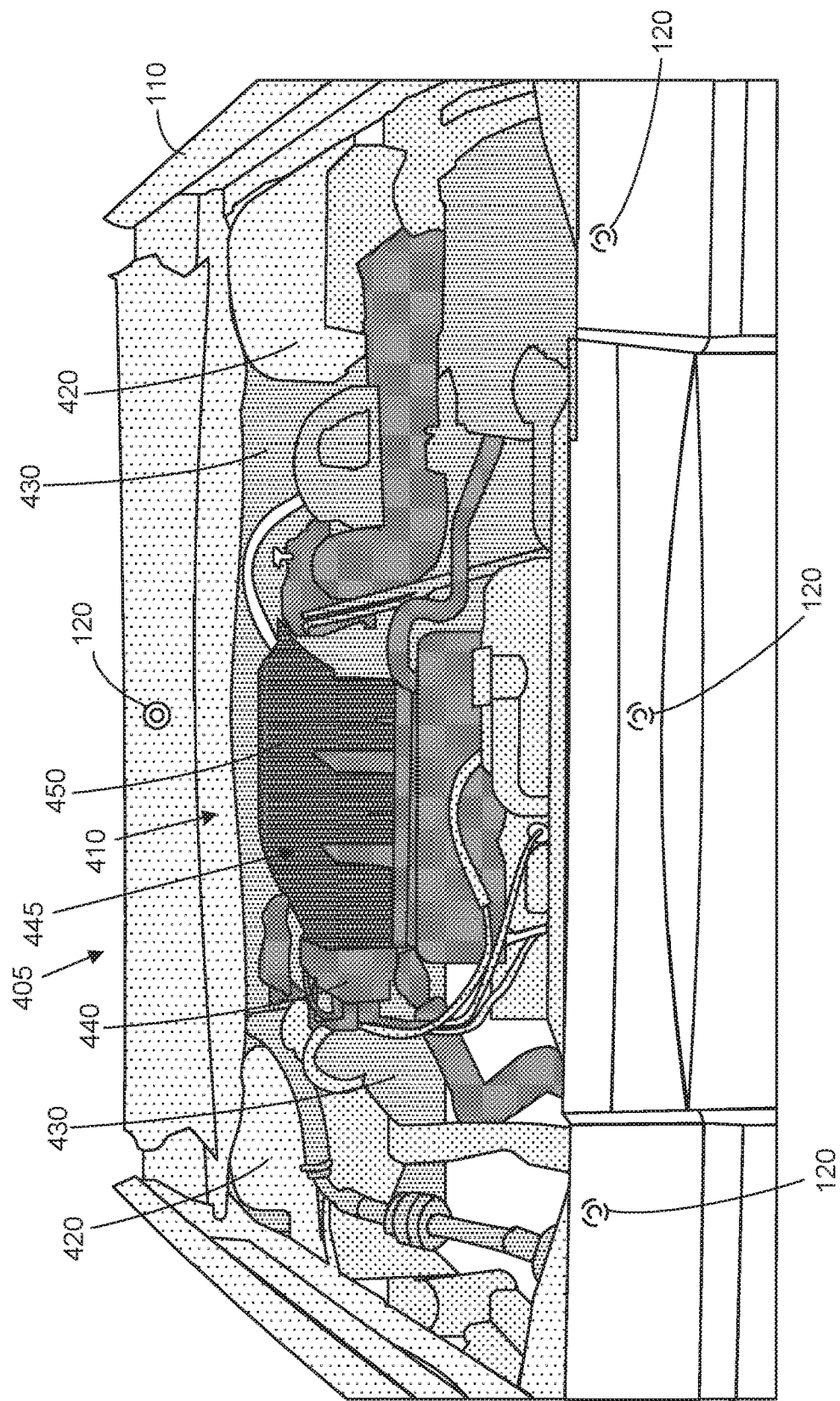

FIGS. 4A-4B illustrate example image data from one or more example image sensors 120 distributed in one or more locations of a selected volume 405 of a structure of the autonomous and/or manned device. In the example of FIGS. 4A-4B, the selected volume 405 includes an engine compartment of a device 110 (e.g., an engine-based vehicle) and the selected structure 410 includes an example engine. In FIGS. 4A-4B, a device 110 hood is removed for clarity. In some examples, one or more image sensors 120 are disposed on an underside of the hood to face the selected volume 405 and the selected structure 410.

FIG. 4A represents example image data at a first time and FIG. 4B represents example image data at a second time. In FIG. 4A, a first set of components is shown to have a first temperature gradient 420, a second set of components is shown to have a second temperature gradient 430 and a third set of components, including an example component 445, is shown to have a third temperature gradient 440, the temperature gradients being represented by different degrees of fill. In the illustrated example, the second temperature gradient 430 is greater than the first temperature gradient 420 and the third temperature gradient 440 is greater than the second temperature gradient 430.

In FIG. 4B, the first set of components is shown to have the first temperature gradient 420, the second set of components is shown to have the second temperature gradient 430 and a third set of components is shown to have the third temperature gradient 440. However, as compared to FIG. 4A, FIG. 4B shows the component 445 in the third set of components has a fourth temperature gradient 450 higher than the third temperature gradient 440.

Example comparisons utilizing the example data of FIGS. 4A-4B are described, by way of example, in FIGS. 5A-5B and FIGS. 6-8.

The programs or instructions of FIGS. 5A-5B begins with program 500 at example block 505 in FIG. 5A, where the image manager 210 of the governor 150 receives N-sets of image data from the image sensor 120 (e.g., 302, 325, 340), where N represents any integer (e.g., 1, 2, 3, etc.). At example block 510 of FIG. 5A, the image manager 210 and/or governor 150 receives N-sets of telemetry data from the sensor(s) 125. In some examples, the image manager 210 and/or governor 150 may perform pre-processing of the image data from the image sensor 120 and/or telemetry data from the sensors 125 at block 515. The pre-processing may be used, for example, to suppress distortions in the data, eliminate noisiness in the data, enhance the data and/or normalize the data. For instance, the image manager 210 may transform the image data into an appropriate coordinate system and into a format that is suitable for further processing by the image manager 210 and/or the impression manager 220 (e.g., converting pointwise laser scanner data into raster models or other format acceptable to downstream processing, correcting grey level values of image data, executing edge detection and segmentation methods to recognize homogeneous regions, employing classification methods to classify regions of the structure(s) represented by the image data, etc.).

The impression manager 220 is then used to form an impression 254 or update the impression 254 at example block 520 of FIG. 5A and to store the impression 254 at example block 522 in a physical, non-transient storage medium. In some examples, the impression manager 220 receives image data from the image sensor 120 of FIG. 1 and/or image sensors 302, 325 and/or 340 of FIGS. 3A-3C and converts the image data, at block 520, into an impression 254 including an array of data vectors representative of the image data for the selected volume 405 and/or selected structure 410 (e.g., a volume in space in the engine compartment of device 110, etc.). In some examples, following the forming of the impression 254 or updating of the impression 254 at block 520 of FIG. 5A, control passes back to block 505 for receipt of additional image data.

FIG. 5B shows example instructions 524 beginning with example block 525, where the image manager 210 of the governor 150 receives image data (e.g., one set of image data, N-sets of image data, etc.) from the image sensor 120 (e.g., 302, 325, 340). At block 530, the image manager 210 and/or the governor 150 receives telemetry data (e.g., one set of image data, N-sets of image data, etc.) from the sensor(s) 125.

In some examples, at example block 535 and/or example block 540, the image manager 210 and/or governor 150 may perform pre-processing of the image data from the image sensor 120 and/or telemetry data from the sensors 125, respectively. The pre-processing may be used, for example, to suppress distortions in the data, eliminate noisiness in the data, enhance the data, normalize the data and/or transform the image data into an appropriate coordinate system and into a format suitable for further processing, such as by the impression manager 220 and/or the impression comparator 230.

At example block 545, the impression comparator 230 applies the impression 254 to the image data. For instance, the governor 150 may use the impression manager 220 to access the impression 254 from the operating state manager 252 and apply the impression 254 to previous samples of image data at times t−1, t−2, ... t−N. As noted above, the impression 254 may include, for example, a mapping of spatial gradients and/or thermal gradients onto a coefficients vector or a set of weights in a matrix representing a neural network (e.g., ANN/RNN/CNN/DNN, "decision tree," SVM, LR, etc.). At example block 545, the impression comparator 230 may also apply the impression 254 to calculate estimated data for time t based on the impressions applied to the previous samples of image data at times t−1, t−2, ... t−N. At block 550, the impression comparator 230 determines a verdict using the impression and the image data, such as by comparing the impression 254 of the estimated data at time t with the actual data at time t. At block 555, the impression comparator 230 renders a verdict as to whether the comparison of the impression 254 of the estimated data at time t with the actual data at time t is favorable and reflects a good verdict (e.g., reflective of a known "good" state of the device 110). In some examples, where previous samples of data at times t−1, t−2, ... t−N are known, the impression comparator 230 applies the impression 254 to the data samples at moments times t, t−1, t−2, ... t−N at block 550 to determine a verdict and determines at block 555 whether the verdict corresponds to a good verdict or a bad verdict.

If the result at block 555 is "YES," the control passes to example block 560, where the governor 150 and/or the impression comparator 230 determines whether the telemetry data from the sensor(s) 125 of the device 110 is within acceptable limits. If the result at block 555 is "NO," the control passes to example block 565, where the impression comparator 230 renders a verdict as to whether the comparison of the impression 254 of the estimated data at time t with the actual data at time t is unfavorable and reflects a bad verdict (e.g., reflective of a known "bad" state of the device 110). In some examples, where previous samples of data at times t−1, t−2, ... t−N are known, the impression comparator 230 applies the impression 254 to the data samples at moments times t, t−1, t−2, ... t−N at block 550 and determines a verdict at block 555 as to whether the comparison is unfavorable and reflects a bad verdict.

If the result at block 565 is "NO," control passes to example block 570, where the impression comparator 230 and/or governor 150 stores the image data in the memory 250 for later evaluation. Control then passes to example block 560, discussed above, where the governor 150 and/or the impression comparator 230 determine whether the telemetry data from the sensor(s) 125 of the device 110 is within acceptable limits.

At block 560, if the telemetry data from the sensor(s) 125 of the device 110 is within acceptable limits (i.e., the result is "YES"), control passes to example block 575, where the impression comparator 230 and/or the governor 150 updates the impression 254 to incorporate the image data as "good" (e.g., reflecting a normal operational condition, reflecting a normal structural condition, etc.). Control then passes to block 525. If the telemetry data from the sensor(s) 125 of the device 110 is not within acceptable limits and the result at block 560 is "NO," control passes to example block 580. At block 580, the impression comparator 230 and/or the governor 150 updates the impression 254 to incorporate the image data as "bad" (e.g., reflecting an abnormal operational condition, reflecting an abnormal structural condition, etc.). Control then passes back to block 585. At block 585, the impression comparator 230 and/or governor 150 stores the image data in the memory 250 for later evaluation. Control then passes to example block 590. At block 590 the governor 150 and/or the impression comparator 230 output a deviation report relating to the impression 254 and/or the image data (e.g., reporting locally to a controller, reporting remotely to a central facility or server, etc.). If a particular deviation report (e.g., a temperature in a particular location of a structure or system of the autonomous or manned device, a displacement of a structure or system of the autonomous or manned device, etc.) is later positively associated with a particular performance issue and/or maintenance issue, the impressions and/or image data can then be flagged as a known problem impression. Particularly for a plurality of similarly configured devices 110 (e.g., a fleet of drones, a fleet of vehicles, etc.), a deviation report issued by one device 110 informing of a potential and/or actual performance and/or maintenance issue may enable trending of problems, targeted preventive maintenance, and timely corrective actions not only for the one device 110, but also for the other similarly configured devices 110.

Figure 6:
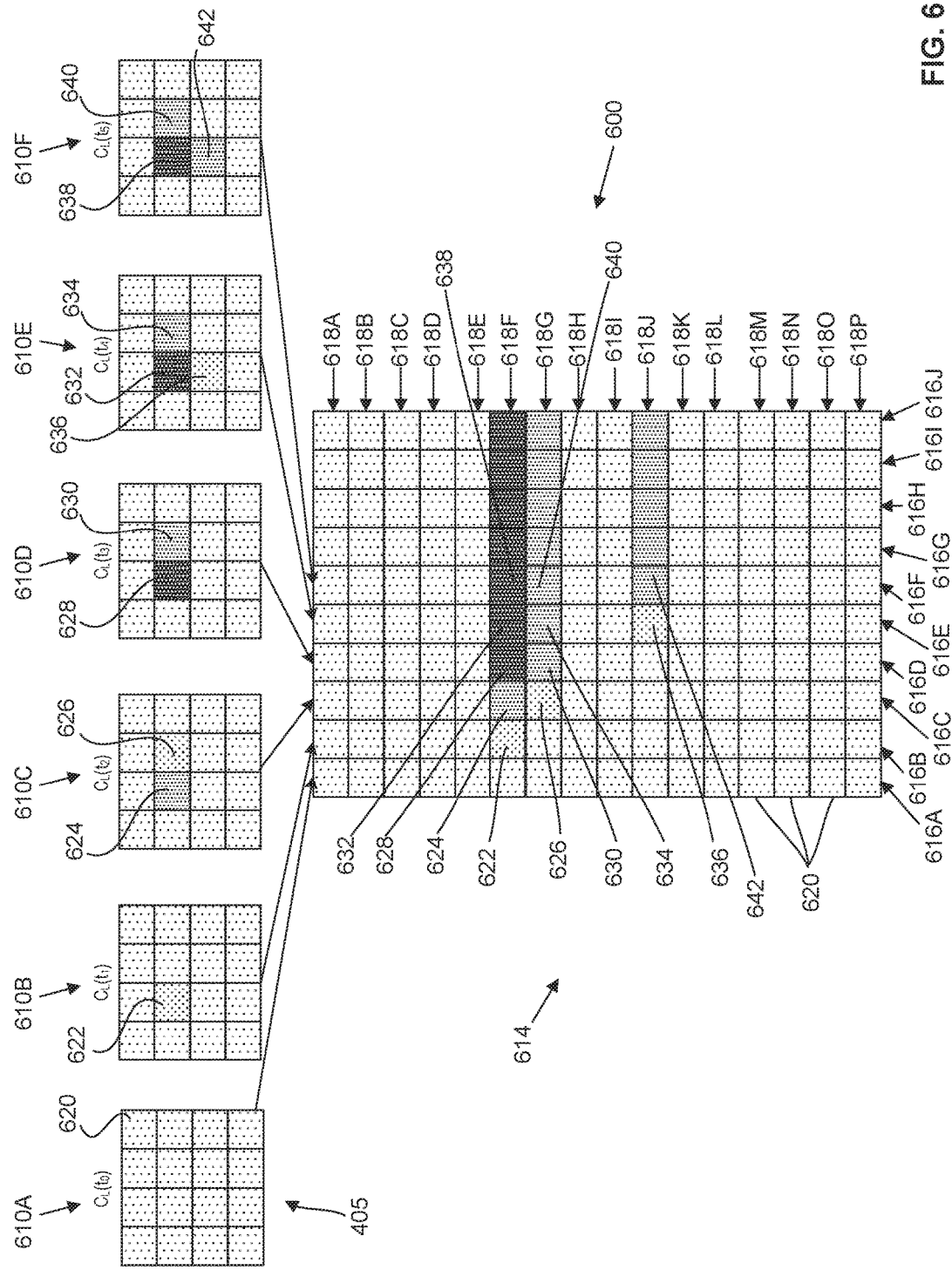
FIG. 6 illustrates a representation of implementation of the example image data from the example image sensors of FIGS. 1 and/or 3A-3C by the example governor of FIGS. 1-2 in accord with the example instructions of FIGS. 5A-5B.

FIG. 6 illustrates a representation of example image data 600 from the image sensor 120 of FIGS. 1 and/or 3A-3C by the governor 150 of FIGS. 1-2 in accord with the example flowchart of FIGS. 5A-5B. In FIG. 6, a series of input data vectors 610A-610F, $C_L(t_0)$-$C_L(t_5)$, represent image data output by image sensor 120 at five different times (i.e., $t_0$-$t_5$) over a selected volume 405 (e.g., a 4×4 volume in space in the engine compartment of device 110, etc.). In some example, the input data vectors 610A-610N, $C_L(t_0)$-$C_L(t_N)$, where N is any integer, are unfolded into an example array 614 of example columns 616A-616N and example rows 618A-618N. Each column (e.g., 616A) and row (e.g., 618A) in the array 614 is represented by an example block 620 corresponding to image data (e.g., temperature, etc.) for a portion of the device 110, such as the selected volume 405, at a particular time.

The first input data vector 610A represents image data for a selected volume 405 at a first time ($t_0$). Each of the blocks 620 of the selected volume 405 has a uniform first temperature, expressed as uniform fill in the first input data vector 610A of FIG. 6. The second input data vector 610B represents image data for a selected volume 405 at a second time ($t_1$). Each block 620 of the selected volume 405, save block 622, has a first temperature, expressed as uniform fill in the second input data vector 610B of FIG. 6. Block 622 is shown to have a second temperature higher than that of the first temperature, expressed as different fill than that of the first temperature. The third input data vector 610C represents image data for a selected volume 405 at a third time ($t_2$). Each block 620 of the selected volume 405, save blocks 624 and 626, has a first temperature, expressed as uniform fill in the third input data vector 610C of FIG. 6. Block 624 is shown to have a third temperature higher than the second temperature, expressed as different fill than that of the second temperature. Block 626 is shown to have a second temperature higher than the first temperature, expressed as different fill than that of the first temperature.

The fourth input data vector 610D represents image data for a selected volume 405 at a fourth time ($t_3$). Some blocks 620 of the selected volume 405 have a first temperature, block 628 is shown to have a fourth temperature higher than the third temperature, and block 630 is shown to have the third temperature, with each of the different temperatures being expressed using a different fill. The fifth input data vector 610E represents image data for a selected volume 405 at a fifth time ($t_4$). Some blocks 620 of the selected volume 405 are shown to have the first temperature, block 632 is shown to have the fourth temperature, and block 634 is shown to have the third temperature higher, with each of the different temperatures being expressed using a different fill. Block 636 of the fifth input data vector 610E is shown to have the second temperature. The sixth input data vector 610F represents image data for a selected volume 405 at a sixth time ($t_5$). Some blocks 620 of the selected volume 405 are shown to have the first temperature, block 638 is shown to have the fourth temperature, and block 640 and block 642 are shown to have the third temperature.

Figure 7:
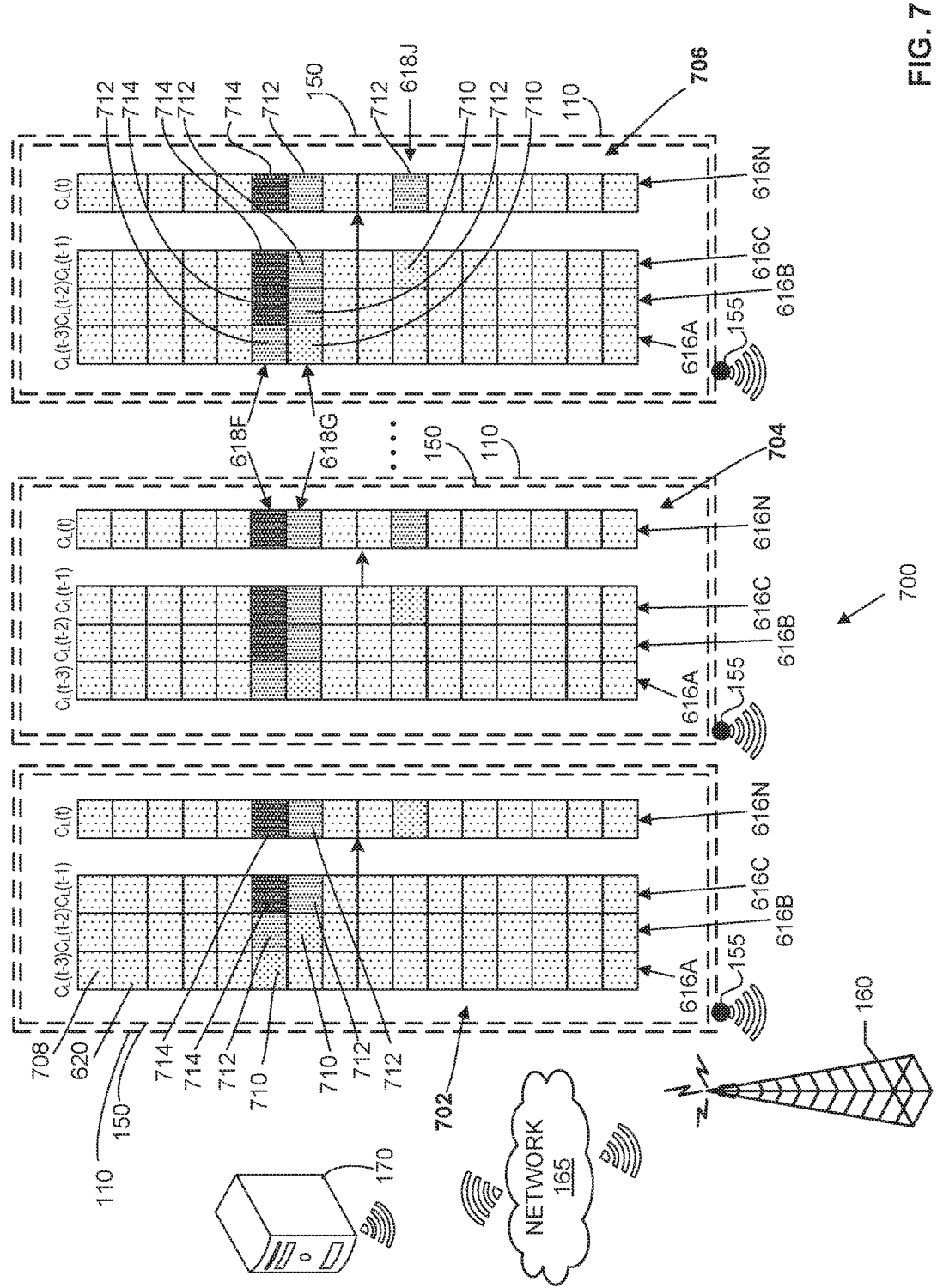
FIG. 7 illustrates an example training model used to form an example impression from the example image data from the example image sensors of FIGS. 1 and/or 3A-3C by the example governor of FIGS. 1-2.

FIG. 7 illustrates an example training model 700 used to form and/or update an impression 254 for device 110 from the image data from the image sensor 120 of FIGS. 1 and/or 3A-3C by the governor 150 of FIGS. 1-2.

FIG. 7 shows example input data vectors ($C_L(t_X)$) over time for the device 110, with an example first training sample 702 occurring at a first time, an example second training sample 704 occurring at a second time and an example third training sample 706 occurring at a third time. In some examples, a plurality of training samples are used to develop the impression 254 to account for normal variations, such as variability in sensor measurements (e.g., sensor accuracy, etc.) and/or non-substantive variations in operational system performance.

In each of the first training sample 702, the second training sample 704 and the third training sample 706, the rows 618F, 618G and 618J include blocks 620 exhibiting higher temperatures than the remaining blocks 620, which are all at the first temperature 708. In the first training sample 702, row 618F shows that the block 620 at column 616A (CL(t−3)) has a second temperature 710 higher than the first temperature 708, the block 620 at column 616B (CL(t−2)) has a third temperature 712 higher than the second temperature 710, the block 620 at column 616C (CL(t−1)) has a fourth temperature 714 higher than the third temperature 712 and the block 620 at column 616N (CL(t)) is shown to have the fourth temperature 714. Row 618G of the first training sample 702 shows that the block 620 at column 616A (CL(t−3)) has the first temperature 708, the block 620 at column 616B (CL(t−2)) has the second temperature 710, the block 620 at column 616C (CL(t−1)) has the third temperature 712 and the block 620 at column 616N (CL(t)) is shown to have the third temperature 712. Row 618J of the first training sample 702 shows that the block 620 at column 616N (CL(t)) has the second temperature 710.

In the second training sample 704 and the third training sample 706, row 618F shows that the block 620 at column 616A ($C_L(t−3)$) has third temperature 712, the block 620 at column 616B ($C_L(t−2)$) has the fourth temperature, the block 620 at column 616C ($C_L(t−1)$) has the fourth temperature and the block 620 at column 616N ($C_L(t)$) has the fourth temperature 714. Row 618G of the first training sample 702 shows that the block 620 at column 616A ($C_L(t−3)$) has the second temperature, the block 620 at column 616B ($C_L(t−2)$) has the third temperature, the block 620 at column 616C ($C_L(t−1)$) has the third temperature and the block 620 at column 616N ($C_L(t)$) has the third temperature. Row 618J of the second training sample 704 shows that the block 620 at column 616C ($C_L(t−1)$) has the second temperature and the block 620 at column 616N ($C_L(t)$) has the third temperature.

In some examples, such as is shown in the example of FIG. 7, image data from the image sensor 120, or derivatives thereof, is communicated from the device 110, via the governor 150 and the communication device 155, to the external machines 170 (e.g., computing devices of any kind, computer, server, etc.) via the RF broadcast tower 160 and/or network 165.

As noted above, in some examples, the training of the impression 254 includes implementation of neural networks, decision trees, support vector machines (SVMs), and/or other machine learning application. The training of the impression 254 may include, for example, updating of a matrix or coefficients responsive to image data from the image sensor 120 to modify the impression 254 to accommodate valid changes in image data. In the example of FIG. 7, a training model (e.g., back propagation model, decision tree based model, etc.) is applied to historic image data (e.g., the first training sample 702 and the second training sample 704) and current image data (e.g., the third training sample 706) so that the impression or trained model would, in view of the historic image data, predict image data close to the current image data. Stated differently, if it is desired to train the impression 254 to predict future values, the training process is advantageously informed via a plurality of examples of result (x1, y1), (x2, y2), . . . (xN, yN), where x would be a vector of input data, and y would be a desirable output. During the training process of the impression 254, impression 254 coefficients are adjusted to incorporate "knowledge" of input image data patterns until the impression starts to approximate, or in fact approximates, a desirable output. At that point, further input of image data into the impression 254 should yield a resulting output close to actual image data in the case of normal, known behavior of the device 110, whereas a resulting output diverging from the actual image data (e.g., incorrect predictions beyond a predetermined percentage difference from the actual image data, incorrect predictions beyond a predetermined threshold from the actual image data, etc.) can be identified.

In some examples, the training of the impression 254 is during normal operation of the device 110 for a sufficient time for the impression 254 to learn actual behavior of the device 110 in advance of any potential for anomalous behavior of the device 110. In some examples, the device 110 may include a vendor-supplied impression 254 (e.g., values of coefficients for a pre-trained model, etc.) in the memory 250.

Figure 8:
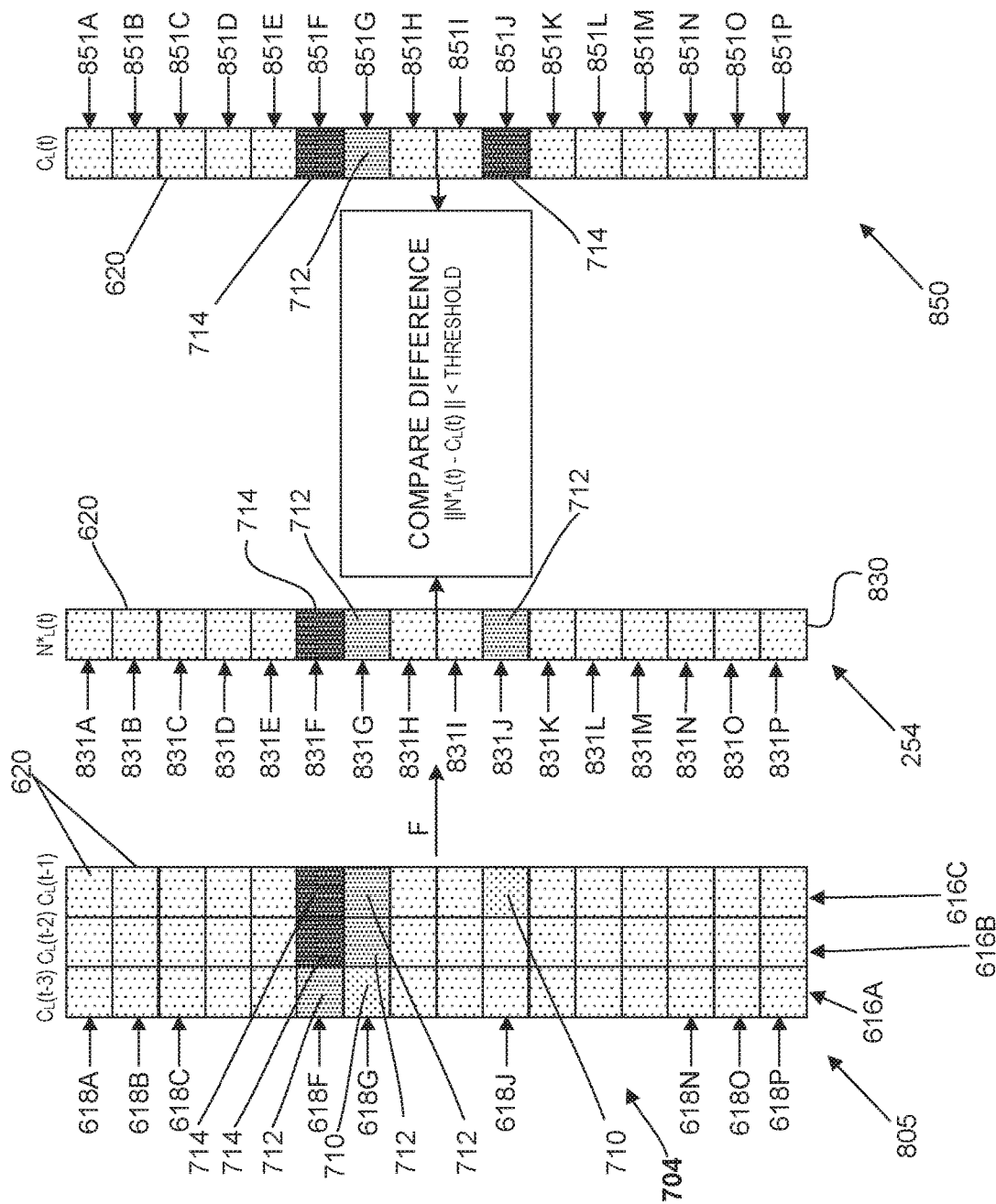
FIG. 8 illustrates an example implementation of the example image data from the example image sensors of FIGS. 1 and/or 3A-3C by the example governor of FIGS. 1-2 in accord with the example instructions of FIGS. 5A-5B.

FIG. 8 illustrates another representation of implementation of the image data from the image sensor 120 of FIGS. 1 and 3A-3C by the governor 150 of FIGS. 1-2 in accord with the example instructions of FIG. 5A and/or FIG. 5B. In particular, FIG. 8 represents a monitoring phase of an impression 254 during operation of device 110. On the left side of FIG. 8 is a representation of an example history 805 for the device 110 (e.g., an example autonomous or manned device, etc.). In FIG. 8, the example history 805 corresponds to training sample 704 described above in relation to FIG. 7. In some examples, the input data vectors $(C_L(t_x))$ (e.g., $C_L(t-3)$, $C_L(t-2)$ and $C_L(t-1)$ of FIG. 8) are analyzed via a function F (e.g., a predictive model derived from the training samples, a predictive function in the form of a neural network, an adjustment via a decision tree learning model, an association rule learning model, etc.) to yield an impression 254 or trained model including an example array 830 of expected values 831A-831P (e.g., data vectors $N^*_L(t)$ containing a predicted distribution based on historic values, etc.). $N^*_L(t)$ and $(C_L(t_x))$ are normalized to a common basis.

The example array 850 of FIG. 8, the image data corresponds to actual temperatures and, more particularly, example rows 851A-851E indicate the first temperature 708, the example row 851F indicates the fourth temperature 714, the example row 851G indicates the fourth temperature 714, the example rows 851H-851I indicate the first temperature 708, the example row 851J indicate the fourth temperature 714 and the example rows 851K-851P indicate the first temperature 708.

The expected values 831A-831P are then compared by the impression comparator 230 to the example rows 851A-851P of data vectors $(C_L(t))$ in example array 850, corresponding to actual image data.

In some examples, the data vectors $(C_L(t))$ of rows 851A-851P of array 850 (e.g., actual values of image data) are compared to the data vectors $(N^*_L(t))$ of the rows of expected values 831A-831P of array 830 (e.g., the expected values of impression 254) to determine if any comparison between corresponding data vectors (e.g., a comparison of the data vector of row 851A to the data vector of row 831A, etc.) is greater than a threshold difference. In some examples, where the data vectors represent temperatures (e.g., absolute temperatures, temperature gradients, etc.), the threshold difference may be expressed in a difference in temperatures (e.g., a difference of 1° F., 2° F., 3° F. . . . 10° F., 20° F., 30° F., etc.). To illustrate, the data vector $C_{10}(t)$ of row 851J is shown to correspond to the fourth temperature 714, whereas the data vector $N^*_{10}(t)$ of row 831J (e.g., the impression) is shown to correspond to the third temperature 712, indicating a difference therebetween. In some examples, where the data vectors represent distances or dimensions, the threshold difference may be expressed in a difference in dimension (e.g., a difference of 0.1 mm, 0.2 mm, 0.3 mm, etc.). In some examples, the threshold difference is determined via a sum of absolute differences, a sum of differences squared, or the like.

Figure 9:
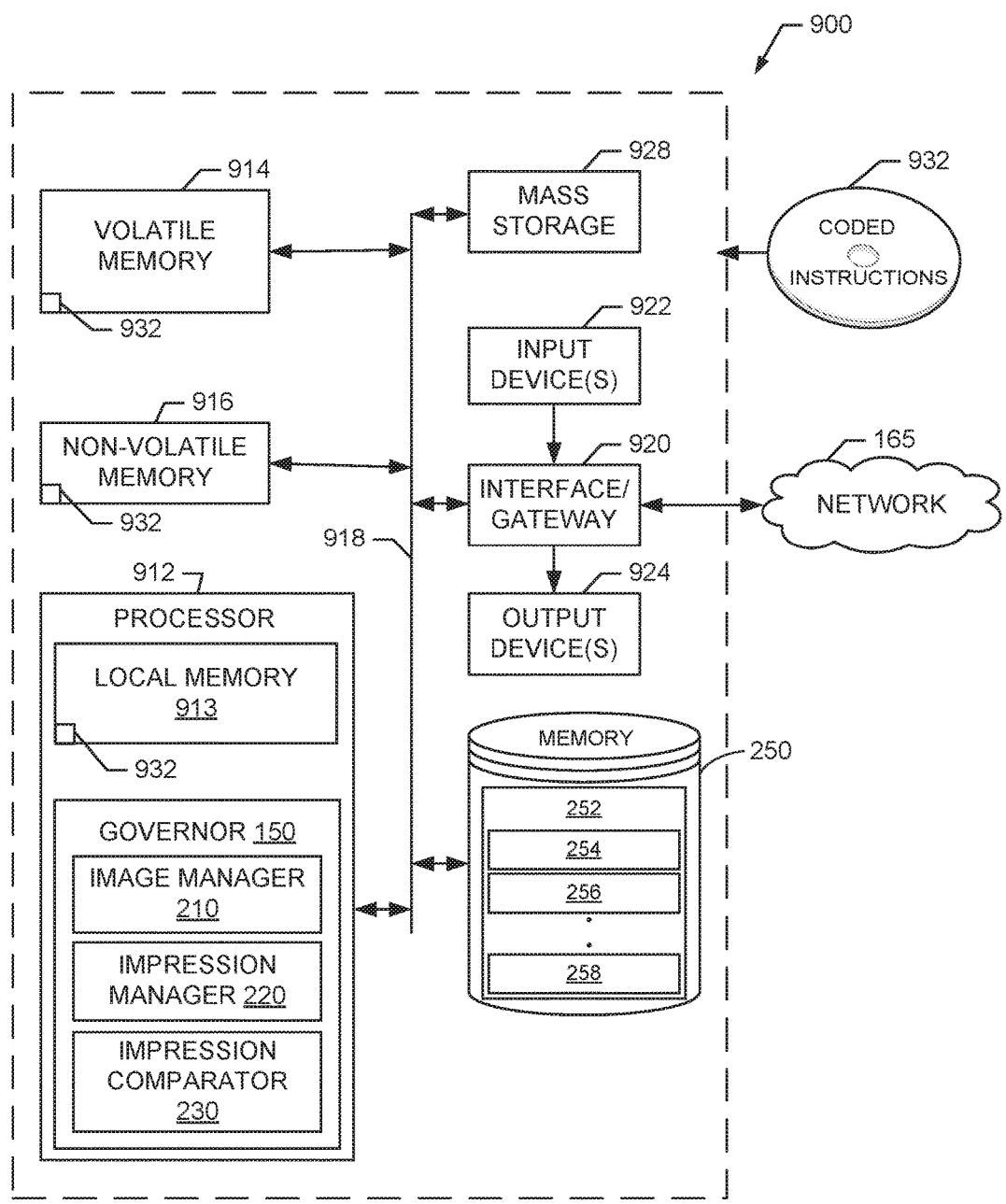
FIG. 9 is a block diagram illustrating an example processor platform which may execute the instructions of FIGS. 5A-5B to implement the example governor of FIGS. 1-2.

FIG. 9 is a block diagram of an example processor platform 900 capable of executing the instructions of FIGS. 5A-5B to implement the example governor 150 of FIG. 2. The processor platform 900 can be, for example, a server, a personal computer, a mobile device (e.g., a cell phone, a smart phone, a tablet such as an iPad™), a vehicle controller, a drone controller, a robotic device controller, a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the governor 150, the image manager 210, the impression manager 220, and the impression comparator 230.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the volatile memory and non-volatile memory 914, 916, local memory and/or main memory is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 165 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5A-5B may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that enable early detection of a wide range of known and/or unforeseeable malfunctions and that enable early intervention. This is particularly advantageous for autonomous devices, as it can help to detect problems before the autonomous devices become unrecoverable, and devices having a high degree of similitude, as knowledge gained on one autonomous and/or manned device can be applied to other similar autonomous and/or manned devices.

Example 1 is a monitoring system including an image sensor to obtain image data of a device and a governor to cause the image sensor to obtain image data of the device, to form an impression from the image data, to use the impression and the image data to generate expected values for a state of the device at a predetermined time, and to compare image data for the structure at the predetermined time with the generated expected values.

Example 2 includes the monitoring system as defined in example 1, wherein the image sensor includes at least one of a thermal image sensor, a spatial image sensor, and an optical image sensor and wherein the image data includes at least one of thermal image data, spatial image data, and optical image data.

Example 3 includes the monitoring system as defined in example 1 or example 2, wherein the image sensor includes a thermal image sensor and a spatial image sensor, wherein the image data includes thermal image data and spatial image data.

Example 4 includes the monitoring system as defined in any of examples 1-3, wherein the image sensor is to obtain the image data of the device, via the image sensor, during operation of the device.

Example 5 includes the monitoring system as defined in any of examples 1-4, wherein the image sensor is to obtain the image data of the device, via the image sensor, between operation cycles of the device.

Example 6 includes the monitoring system as defined in any of examples 1-5, wherein the impression is formed from a plurality of sets of the image data.

Example 7 includes the monitoring system as defined in any of examples 1-6, further including a non-transitory machine readable medium to store at least one of the impression or the image data.

Example 8 includes the monitoring system as defined in any of examples 1-7, wherein the impression includes a mapping of at least one of spatial gradients or thermal gradients within a selected volume of a structure of the device onto coefficients vectors to permit comparison, over respective basis spaces, to actual values from the image data.

Example 9 includes the monitoring system as defined in any of examples 1-8, wherein the governor is to, following the comparison of the image data for the device at the predetermined time with the generated expected values from the impression, determine whether telemetry data from instruments monitoring one or more systems or subsystems of the device is within acceptable limits.

Example 10 includes the monitoring system as defined in any of examples 1-9, further including a communication device to communicate, to a remote device, at least one of the impression, the image data, or a deviation report relating to the impression.

Example 11 includes the monitoring system as defined in any of examples 1-10, wherein the governor is to generate a deviation report responsive to a difference between an expected value generated from by the impression and an actual value of the image data.

Example 12 includes the monitoring system as defined in any of examples 1-11, wherein the remote device includes another device similarly configured to the device.

Example 13 includes the monitoring system as defined in any of examples 1-12, wherein the remote device includes a central server or service in communication with a plurality of similarly configured device.

Example 14 is a method for automated monitoring of a device, including imaging a device during an operating state of the device to obtain first image data, forming an impression from the first image data, imaging the device during a subsequent operating state of the device to obtain second image data, estimating values for the second image data using the impression, and comparing the estimated values for the second image data to actual values for the second image data.

Example 15 includes the method for automated monitoring of claim 14, and further includes determining if a difference between the estimated values for the second image data and the actual values for the second image data is less than a threshold difference.

Example 16 includes the method for automated monitoring of claim 14 or claim 15, and further includes determining if telemetry data from a sensor of the device is within acceptable limits.

Example 17 includes the method for automated monitoring of any of claims 14-16, and further includes updating the impression to incorporate the second image data as good data if the telemetry data is within acceptable limits.

Example 18 includes the method for automated monitoring of any of claims 14-17, and further includes updating the impression to incorporate the second image data as bad data if telemetry data from a sensor of the device is not within acceptable limits.

Example 19 includes the method for automated monitoring of any of claims 14-18, and further includes outputting a deviation report.

Example 20 includes the method for automated monitoring of any of claims 14-19, and further includes, following a determination that the difference between the estimated values for the second image data and the actual values for the second image data are less than the threshold difference, comparing the estimated values for the second image data to known values corresponding to a bad outcome to determine if the estimated values for the second image data correspond to the bad outcome.

Example 21 includes the method for automated monitoring of any of claims 14-20, and further includes outputting a deviation report if the estimated values for the second image data are determined to correspond to the bad outcome.

Example 22 includes the method for automated monitoring of any of claims 14-21, and further includes determining if telemetry data from a sensor of the device is within acceptable limits if the estimated values for the second image data are determined not to correspond to the bad outcome.

Example 23 includes the method for automated monitoring of any of claims 14-22, and further includes updating the impression to incorporate the second image data as good data if the telemetry data is within acceptable limits.

Example 24 is a system including an imaging means to obtain image data of a device and a governing means to cause the imaging means to obtain image data of the device, to form an impression from the image data, to use the impression and the image data to generate expected values for a state of the device at a predetermined time, and to compare image data for the device at the predetermined time with the generated expected values.

Example 25 includes the system of claim 24, wherein the imaging means includes at least one of a thermal imaging means, a spatial imaging means, and an optical imaging means and wherein the image data includes at least one of thermal image data, spatial image data, and optical image data.

Example 26 includes the system of claim 24 or claim 25, wherein the imaging means includes a thermal imaging means and a spatial imaging means, and wherein the image data includes thermal image data and spatial image data.

Example 27 includes the system of claims 24-26, wherein the imaging means is to obtain the image data of the device, via the imaging means, during operation of the device.

Example 28 includes the system of claims 24-27, wherein the imaging means is to obtain the image data of the device, via the imaging means, between operation cycles of the device.

Example 29 includes the system of claims 24-28, wherein the impression is formed from a plurality of sets of the image data.

Example 30 includes the system of claims 24-29, further including a communication means to communicate to a remote device at least one of the impression, the image data, or a deviation report relating to the impression in response to a difference between expected values generated from the impression and actual values of the image data exceeding a threshold difference.

Example 31 is a non-transitory machine readable medium comprising executable instructions that, when executed, cause at least one processor to image a device during an operating state of the device to obtain first image data, form an impression from the first image data, image the device during the operating state of the device to obtain second image data, estimate values for the second image data using the impression and compare the estimated values for the second image data to actual values for the second image data.

Example 32 includes the non-transitory machine readable medium of claim 31, and further includes executable instructions that, when executed, cause at least one processor to determine if a difference between the estimated values for the second image and the actual values for the second image data is less than a threshold difference.

Example 33 includes the non-transitory machine readable medium of claim 31 or claim 32, and further includes executable instructions that, when executed, cause at least one processor to determine if telemetry data from a sensor of the device is within acceptable limits.

Example 34 includes the non-transitory machine readable medium of any of claims 31-33, and further includes executable instructions that, when executed, cause at least one processor to update the impression to incorporate the image data as good data if the telemetry data is within acceptable limits.

Example 35 includes the non-transitory machine readable medium of any of claims 31-34, and further includes executable instructions that, when executed, cause at least one processor to update the impression to incorporate the image data as bad data if telemetry data from a sensor of the device is not within acceptable limits.

Example 36 includes the non-transitory machine readable medium of any of claims 31-35, and further includes executable instructions that, when executed, cause at least one processor to output a deviation report if a difference between the estimated values for the second image and the actual values for the second image data is greater than a threshold difference.

Example 37 is a monitoring system including an image sensor to obtain image data of a device and a governor to cause the image sensor to obtain image data of the device, to form an impression from the image data, to use the impression and the image data to determine a verdict.

Example 38 includes the monitoring system of claim 37, wherein the verdict is determined by using the impression and the image data to generate expected values for a state of the device at a predetermined time and to compare image data for the device at the predetermined time with the generated expected values.

Example 39 includes the monitoring system of claim 37 or claim 38, wherein the impression is to determine the verdict using the image data directly.

Although certain example methods, device and articles of manufacture have been disclosed herein, the scope of coverage of this patent is not limited thereto. On the contrary, this patent covers all methods, device and articles of manufacture fairly falling within the scope of the claims of this patent. For instance, while examples herein have disclosed implementation of an image sensor 120 to obtain image data representative of a temperature of one or more objects in a specified volume 405, in some examples contactless thermometers (pyrometers) and/or contact thermometer arrays (a plurality of thermometers) may be placed on surfaces of one or more parts to provide temperature data in lieu of image data.

What is claimed is:

1. A monitoring system, comprising:
a thermal image sensor to obtain thermal image data of a device; and
a governor to:
form an impression from the thermal image data, the impression to map thermal gradients within a selected volume of a structure of the device onto coefficients vectors,
generate expected values for a state of the device at a predetermined time based on the impression and the thermal image data, and
compare the thermal image data for the device at the predetermined time with the generated expected values.

2. The monitoring system of claim 1, further including an optical image sensor to obtain optical image data.

3. The monitoring system of claim 1, further including a spatial image sensor to obtain spatial image data.

4. The monitoring system of claim 3, wherein the impression is to map spatial gradients within the selected volume of the structure of the device onto coefficients vectors.

5. The monitoring system of claim 1, wherein the thermal image sensor is to obtain the thermal image data of the device during operation of the device.

6. The monitoring system of claim 1, wherein the thermal image sensor is to obtain the thermal image data of the device between operation cycles of the device.

7. The monitoring system of claim 1, wherein the impression is formed from a plurality of sets of the thermal image data.

8. The monitoring system of claim 1, further including a communication device to communicate, to a remote device the impression, the thermal image data and a deviation report relating to the impression, the governor to generate the deviation report in response to a difference between expected values generated from the impression and actual values of the image data.

9. The system of claim 1, wherein the governor is to update the coefficient vectors to modify the impression based on a change in the thermal image data.

10. The system of claim 1, wherein the governor is to form the impression based on a plurality of training samples occurring over time, and the governor is to adjust the coefficient vectors for respective training samples.

11. A method for automated monitoring of a device, comprising:
thermal imaging a device during an operating state of the device to obtain first thermal image data;
forming an impression from the first thermal image data, the impression to map thermal gradients within a selected volume of a structure of the device onto coefficients vectors;
imaging the device during a subsequent operating state of the device to obtain second thermal image data;
estimating values for the second thermal image data using the impression; and
comparing the estimated values for the second thermal image data to actual values for the second thermal image data.

12. The method of claim 11, further including determining if a difference between the estimated values for the second thermal image data and the actual values for the second thermal image data is less than a threshold difference.

13. The method of claim 12, further including determining if telemetry data from a sensor of the device is within acceptable limits.

14. The method of claim 13, further including updating the impression to incorporate the second thermal image data as good data if the telemetry data is within acceptable limits.

15. The method of claim 13, further including updating the impression to incorporate the second thermal image data as bad data if telemetry data from a sensor of the device is not within acceptable limits.

16. The method of claim 15, further including outputting a deviation report.

17. The method of claim 12, further including, following a determination that the difference between the estimated values for the second thermal image data and the actual values for the second thermal image data are less than the threshold difference, comparing the estimated values for the second thermal image data to known values corresponding to a bad outcome to determine if the estimated values for the second thermal image data correspond to the bad outcome.

18. A monitoring system, comprising:
a thermal image sensor to obtain thermal image data of a device; and
a governor to:
form an impression from the thermal image data, the impression to map thermal gradients within a selected volume of a structure of the device onto coefficients vectors, and
use the impression and the thermal image data to determine a verdict.

19. The monitoring system of claim 18, wherein the verdict is determined by using the impression and the thermal image data to generate expected values for a state of the device at a predetermined time and to compare the thermal image data for the device at the predetermined time with the generated expected values.

20. The monitoring system of claim 18, wherein the impression is to determine the verdict using the thermal image data directly.

* * * * *